Sept. 16, 1952  F. C. WORTH  2,610,556
DEVICE FOR MAKING TUBES FROM SHEET MATERIAL
Filed Aug. 25, 1950  6 Sheets-Sheet 1

Inventor
Francis C. Worth

Clarence A. O'Brien
and Harvey B. Jacobson
Attorneys

Sept. 16, 1952 F. C. WORTH 2,610,556
DEVICE FOR MAKING TUBES FROM SHEET MATERIAL
Filed Aug. 25, 1950 6 Sheets-Sheet 2
Fig. 3
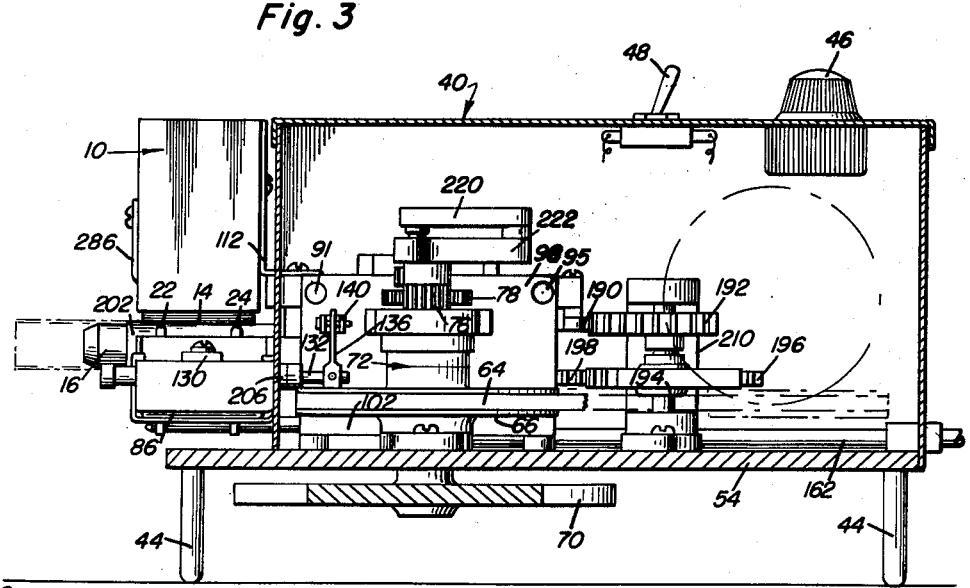
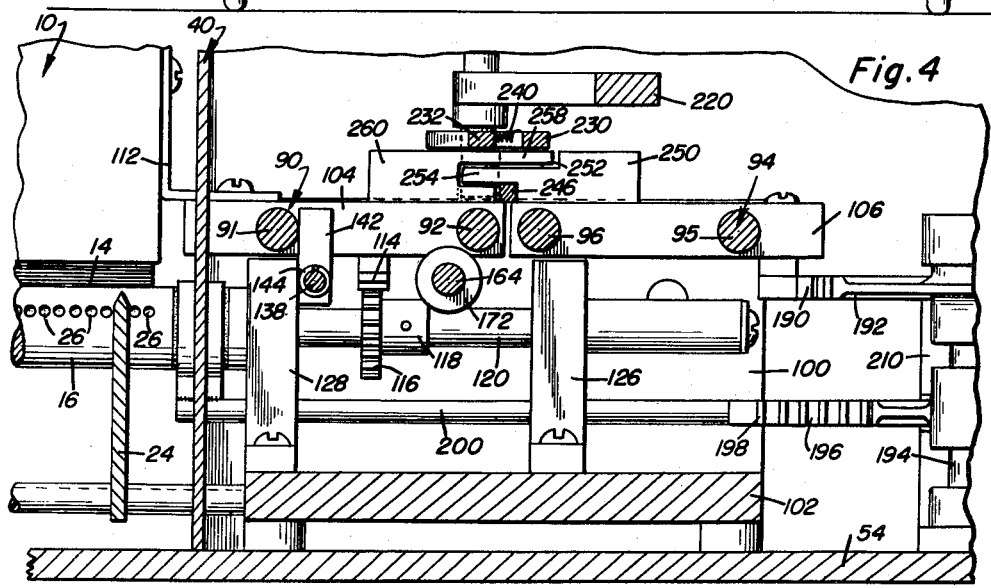
Fig. 4
Fig. 5.
Inventor
Francis C. Worth Sept. 16, 1952  F. C. WORTH  2,610,556
DEVICE FOR MAKING TUBES FROM SHEET MATERIAL
Filed Aug. 25, 1950  6 Sheets-Sheet 3

Inventor
Francis C. Worth

By *Clarence A. O'Brien*
and *Harvey B. Jacobson*
Attorneys

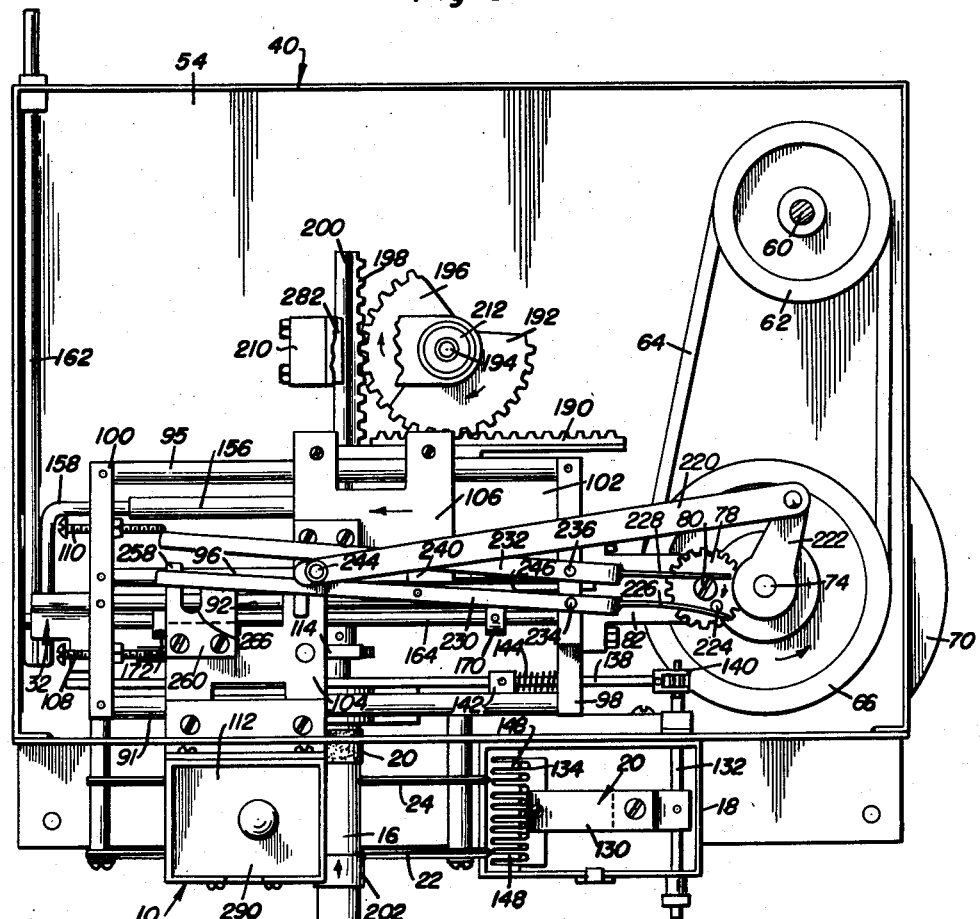

Sept. 16, 1952  F. C. WORTH  2,610,556
DEVICE FOR MAKING TUBES FROM SHEET MATERIAL
Filed Aug. 25, 1950  6 Sheets-Sheet 5

Inventor
Francis C. Worth

Sept. 16, 1952       F. C. WORTH       2,610,556
DEVICE FOR MAKING TUBES FROM SHEET MATERIAL
Filed Aug. 25, 1950       6 Sheets-Sheet 6
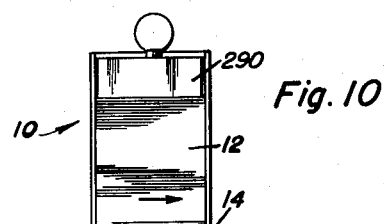
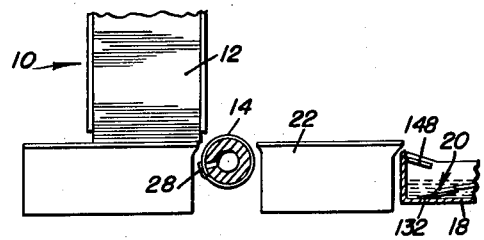
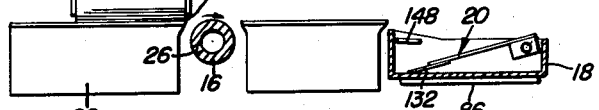
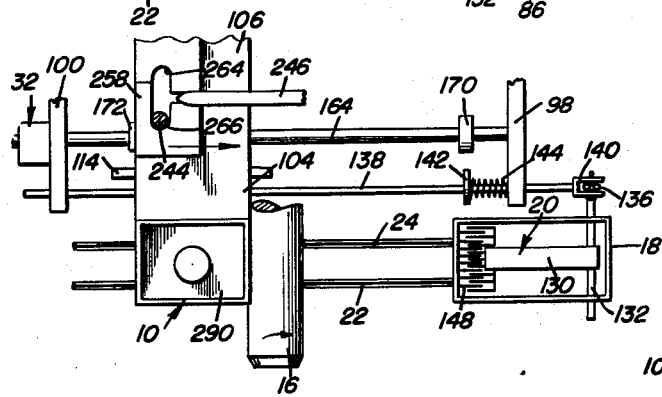
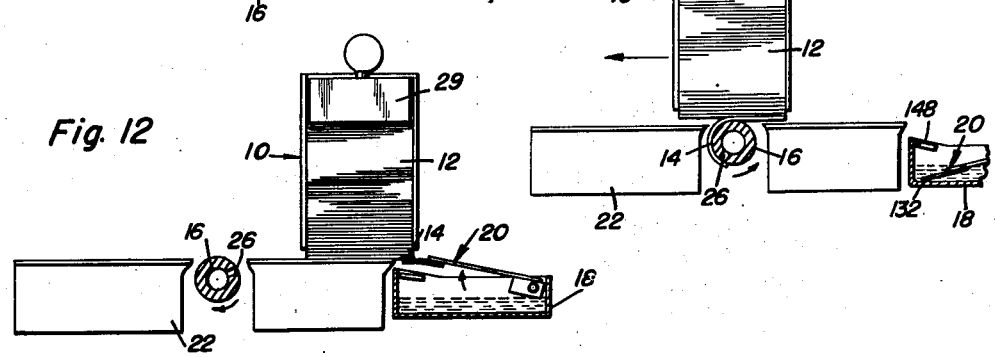
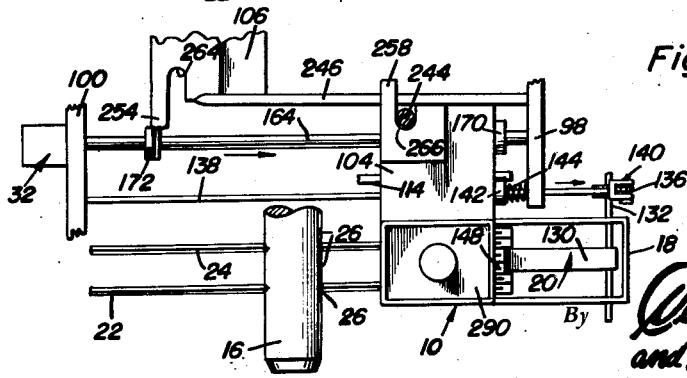
Inventor
Francis C. Worth
By Clarence A. O'Brien
and Harvey B. Jacobson
Attorneys Patented Sept. 16, 1952

2,610,556

UNITED STATES PATENT OFFICE 2,610,556

DEVICE FOR MAKING TUBES FROM SHEET MATERIAL

Francis C. Worth, Ridgewood, N. Y.

Application August 25, 1950, Serial No. 181,514

16 Claims. (Cl. 93—77)

1

This invention relates to a device for applying labels, bands or rings of paper or other suitable material on flexible tubes, containers, balls and other objects.

An object of this invention is to provide an assembly which includes a magazine having an open bottom reciprocable above a pair of supports for the labels in the magazine, the magazine being arranged above a rotating mandrel, the assembly being such that the magazine moves the stack of labels over this mandrel to a glue applicator which applies glue to one edge of the bottom label, then when the magazine returns, the opposite edge of the bottom label or sheet of flexible material is held by suction on the mandrel hence rolling the bottom label on the mandrel so that it conforms to the shape of the mandrel, usually cylindrical, whereby the sheet material or label is formed in the shape of a tube or cylinder for sliding over an article.

Another object of this invention is to urge the formed label from the mandrel by means of a pusher which operates in timed sequence with the movement of the magazine, there being also provided in alignment with the longitudinal axis of the mandrel, a recess or aperture to accommodate the object so that a pusher will urge the formed labels or band from the mandrel directly on the article.

A further object of this invention is to provide an improved mechanical movement in the invention, which mechanical movement includes a rod to operate successively and independent of each other, a pair of carriage blocks, said rod obtaining its motive force from a crank, the crank actuating a rotary disk, for example a gear, which has a pin rising therefrom, said pin being engageable with two springs, preferably of the leaf type, which springs are attached to guides and the guides being pivotally mounted are operated by the action of the pin striking the springs to pivotally shift them so that the operating element which is carried by the rod is pressed into the pockets of the carriage blocks and held there until such time that the element should be transferred from one block to the other inasmuch as these blocks are actuated alternately and independently of each other.

A further object of this invention is to provide a glue pot in which the glue applicator is operable, the glue pot having a means disposed therein to break the small webs of glue which are formed between the fingers of the applicator, prior to the contact of the applicator with one edge of the bottom label of the stack so that

2 the glue is applied in the proper amount and in a number of small quantities on the proper edge of the label and so located as to avoid contact with the label supports.

Ancillary objects and features of importance will become apparent in following the description of the illustrated form of the invention.

In the drawings:

Figure 3 is a sectional view taken substantially on the line 3—3 of Figure 2 and in the direction of the arrows;

Figure 4 is an enlarged sectional view taken substantially on the line 4—4 of Figure 6 and in the direction of the arrows;

Figure 5 is an enlarged sectional view taken substantially on the line 5—5 of Figure 1 and in the direction of the arrows, showing particularly the mandrel and shaft assembly;

Figure 8 is a top view of the device similar to that shown in Figure 7 illustrating the condition of elements when the second carriage block has completed about three-quarters of its cycle of operation;

Figure 10 is a schematic view showing the relationship of the magazine, spindle and glue pot with its applicator at the start of the first cycle of operation of the machine;

Figure 11 is a plan view of the structural elements in Figure 10 also showing the means of operating the valve and the means of operating the glue applicator;

Figure 12 is a schematic view showing the relationship of the mandrel, magazine and glue applicator at the instant in which the applicator touches one edge of the bottom sheet of the stack of sheets in the magazine;

Figure 13 is a plan view of the schematically illustrated elements of Figure 12 and includes also other structural elements;

Figure 14 is a schematic view showing the bottom label of the magazine being wrapped around the mandrel and held in place by the suction in the suction ports, illustrating also the direction of movement of the magazine;

Figure 15 is a schematic view somewhat similar to that of Figure 14 but showing the bottom label wrapped entirely around the mandrel and illustrating the overlap of the tube;

Figure 17 is a plan schematic view similar to that of Figure 16 but showing the label, now in the form of a tube being pushed from the mandrel.

Figure 1:
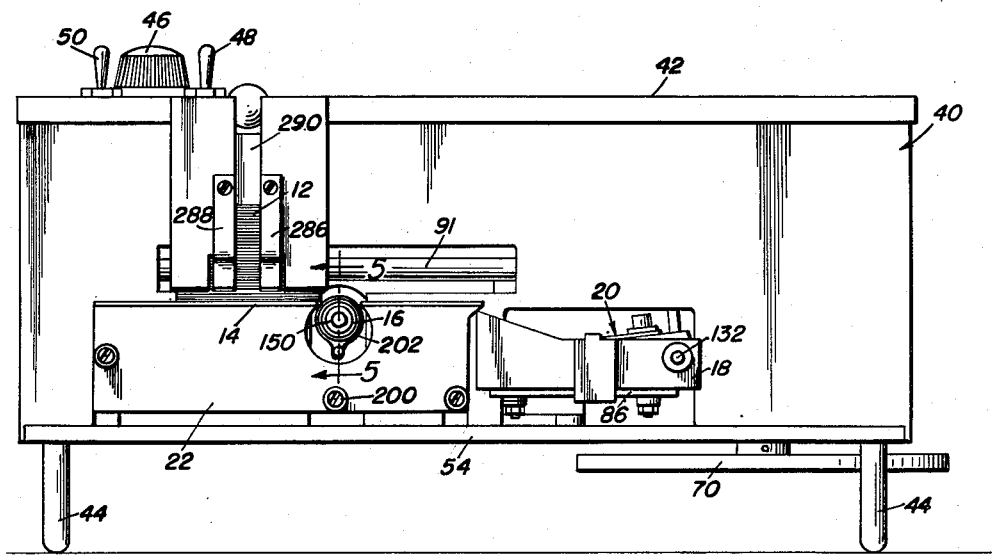
Figure 1 is a front view of the device.
Figure 2:
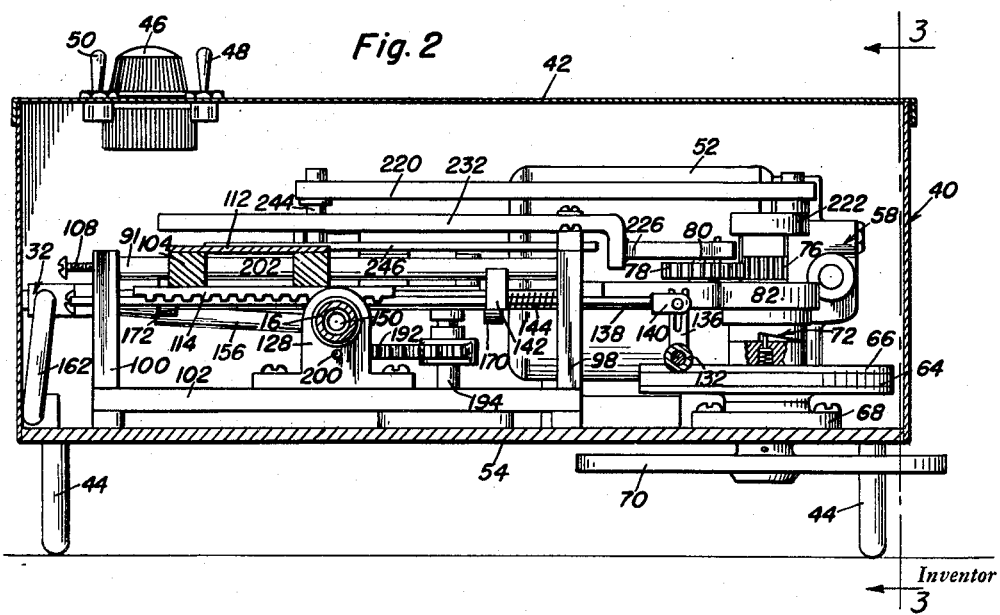
Figure 2 is a sectional view taken substantially on the line 2—2 of Figure 6 and in the direction of the arrows, the elements of the device being arranged in a position corresponding to the start of one cycle of operation.

This invention is a sheet material, for example paper labels, handler and has for its general purpose the reduction of expense involved in placing labels on various articles such as flexible or rigid containers, balls of thread and many others.

The illustrated embodiment of the invention is semiautomatic that is, a worker holds an article in a recess of the mandrel which constitutes an article holder, while a single sheet from a padded stack is taken therefrom, formed in a tube or band and then placed around the article while the worker holds the article in place. After supplying the device with the necessary sheets and glue, nothing more need be done except operating the necessary controls to start the machine initially, for the device to perform the extracting, shaping and gluing as well as the discharging operations. If the article is held in the proper disposition with respect to the mandrel on which the sheet is formed into a tube, the tube is placed directly around the article.

Attention is first invited to the schematic illustrations of Figures 10–17. There is a magazine 10 with a stack 12 of individual labels, the bottom one of which is illustrated at 14. A rotary mandrel 16 is disposed below the magazine 10 and there is a glue pot 18 also located below the magazine but spaced from the mandrel 16. A glue applicator 20 is disposed in the glue pot.

The magazine 10 has an open bottom so that the stack of labels may rest upon the two supports or rails 22 and 24 which are arranged parallel to each other below the magazine.

Following Figures 10–17 in that order, the general operation of the invention will be discussed. The magazine 10 is located with respect to the mandrel 16 prior to any movement of any of the parts. Then, the magazine is caused to move over the rotating mandrel 16 to the position disclosed in Figure 12, at which time the glue applicator 20 is lifted to apply a small amount of glue to one edge of the label 14 and opening suction valve at same time. Then the magazine 10 is returned as disclosed in Figure 14. But, during the return of the magazine the edge of the label 14 opposite from that edge having the glue thereon is attracted to the mandrel 16 due to suction in the suction port or ports 26 which open laterally of the mandrel. The mandrel is caused to rotate at such speed that its surface travels at precisely the same speed as the bottom label of the stack 12 in the magazine 10. Hence, there is no relative movement between the label and the mandrel while the magazine is being returned as disclosed in Figure 14.

Inasmuch as there is rotation of the mandrel 16 and one edge of the label 14 is held thereon, the label will be wrapped around the mandrel to assume the shape of the said mandrel, in this instance cylindrical.

The magazine 10 continuing to move in the direction of the arrow of Figure 14 and the mandrel 16 continuing to rotate causes the label 14 to be wrapped on the mandrel. Due to the relative size of the periphery of the mandrel and the length of the label 14, there is an overlap 28 of the label, the glued edge of the label resting upon the opposite edge thereof. This forms the label 14 so that it is tubular with the weight 290 pressing the two edges together.

The stack 12 of labels must be padded for completely successful operation that is, along at least one side of the stack 12 there is a gum of a conventional type provided. A proper selection of glue in the glue pot 18 also aids in satisfactory operation of the device.

After the magazine 10 comes to rest in the position shown in Figure 15 a pusher or discharge means 30 slides the label 14, in the form of a tube, from the mandrel. As disclosed in Figures 16 and 17, the valve 32 controlling the suction in the ports 26 is closed when the magazine 10 is disposed in the position shown in Figure 15. Hence, the suction force which formerly retained the tubular shaped label on the mandrel is no longer present and the pusher may slide the label 14 from the mandrel, two positions of the pusher and tube being disclosed in Figure 16 and in Figure 17.

When an article, for example the container 34, is held at the discharge end of the mandrel 16 the means for sliding the label 14 from the mandrel slides the same label directly on the container.

The above description of the general operation deals with the handling of the label 14 which is the lowermost one of the padded stack 12 and shows in general how the ultimate end of the invention is attained.

Referring now to Figure 1 there is illustrated a housing generally indicated at 40 which has a cover 42 disposed thereon and a number of legs 44 to support the housing. A rheostat 46 is disposed on the cover 42 and there is a motor switch 48 together with a heater switch 50 carried by the cover 42. The motor switch 48 controls the actuation of the motor 52, which is located in said housing 40 and disposed directly on the base 54 of the housing or on a motor mount plate 56 which is carried by the base 54 of the housing. This motor has a standard transmission 58 built at one end thereof which, through a power shaft 60 operates a pulley 62. This pulley, through the belt 64, rotates the pulley 66 which is mounted freely on a shaft 74 disposed in the bearing 68 on the base 54 of the housing 40 and bearing in bracket 82. A handwheel 70 is fixed to the last mentioned shaft and is disposed exteriorly of said housing 40 for manual operation of the moving elements of the device, as during an emergency or for adjustment purposes with respect to a single application of a label on a container. A clutch 72 connects the pulley 66 with the shaft 74 which has the crank 222 and the pinion 76 fixed thereto. This pinion is enmeshed with a gear 78, carried on a spindle 80 which is mounted on the support bracket 82.

The clutch 72 is a conventional one-way type that is, when the pulley 66 is rotated in one direction there is driving connection between the pulley and the shaft 74, and when the handwheel 70 is rotated in the same direction, there is slippage at the clutch 72. As previously described the glue pot 18 is used for the purpose of supplying the applicator 20 with an ample quantity of glue. In work of this type it is preferable to use heat softening glue and therefore, a heater 86 of standard construction is connected with the glue pot 18 and is controlled in its operation by means of the switch 50. Prior to setting the machine in operation the switch 50 should be actuated so as to heat the contents of the glue pot 18.

In order that controlled heat of the glue in the glue pot may be arrived at the rheostat 46 is appropriately connected in the line leading to the glue pot so that manual selection of glue temperature is obtained.

I have described in general terms that the magazine moves and that certain operations take place when the magazine does move. The movement of the magazine is accomplished by employing a first set 90 of rails 91 and 92 and a second set 94 of rails 95 and 96 which are disposed in vertical supports 98 and 100 carried by a mounting plate 102 which is attached to the base 54 of the housing 40 or, which are themselves attached directly to the base 54 of the housing 40. A first carriage block 104 is mounted for sliding movement on the first set of rails 90 and a second carriage block 106 is mounted for sliding movement on the set 94 of rails. An adjustable stop, preferably in the form of a simple screw 108 is carried by the support 100 to limit the movement in one direction of the carriage block 104 and there is a similar stop 110 for the carriage block 106.

Attention is first invited to the carriage block 104 which moves in a single reciprocatory cycle of operation for each label forming operation. The magazine 10 is fixed by means of a mounting bracket 112, which passes through a suitable slot in one wall of the housing 40, to the carriage block 104. Hence, when the block 104 moves the magazine moves with it.

Fixed to the undersurface of the block 104 is a rack gear 114 which is engaged with a pinion 116, this pinion being fixed to a collar 118 (Figure 5). The collar is attached to the spindle portion 120 of the mandrel 16 and the spindle portion is mounted in suitable bearings 122 and 124 which are disposed on the supports 126 and 128. These supports are carried directly by the base 54 or carried on the mounting plate 102, as found desirable.

It is now seen that when the carriage block 104 is reciprocated the mandrel 16 is rotated. When the carriage moves from the starting point of its cycle of operation toward the glue pot 18 the mandrel is rotated in one direction. But the mandrel is rotated in the opposite direction when the carriage block 104 is returned.

The applicator 20 consists of a spring arm 130 which is secured at one end to the oscillatory shaft 132 and which has a bank of fingers 134 at the opposite end. The oscillatory shaft 132 passes through suitable bearings in openings in one wall of the housing 40 and in the glue pot 18. A small crank 136 is fixed to one end of the oscillatory shaft 132 and is connected with the operating rod 138 through the medium of the bifurcated coupling 140.

As disclosed in Figure 12, when the magazine is in such position that the fingers 134 of the glue applicator 20 will touch one edge of the label 14, the applicator should be lifted. Accordingly the operating rod 138 passes through openings in the supports 98 and 100 and there is a stop 142 fixed to the operating rod. A spring 144 bears upon one surface of the stop 132 and upon one surface of the support 98 in order to oppose the operation of the operating rod 138. When the block 134 reaches such position on its set of rails 90 that the stop 142 is contacted, further linear movement of the block 134 will cause the operating rod 138 to be pushed. This in turn rotates the shaft 132 through the crank 136 and lifts the group of fingers 134 from the glue in the glue pot 18. The stop 142 is adjustably attached to the rod 138, preferably by means of a set screw, whereby the timing relationship of the magazine and glue application may be varied. It is essential that a proper amount of glue be applied to one edge of the label 14. Therefore in arriving at this amount it has been found best to apply the glue in small quantities spaced slightly from each other on one edge of the label 14. Accordingly there are a number of arms 148 extending from one wall of the glue pot 18 and these arms are interfitted with the fingers 134 in order to break the webs of glue extending between fingers 134 after the applicator 20 has been lifted from the glue supply. Therefore, when the fingers 134 contact one lower edge of the label 14 they deposit small quantities of glue in individual amounts.

Figure 9:
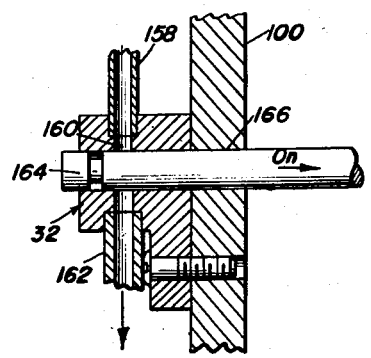
Figure 9 is an enlarged sectional view taken substantially on the line 9—9 of Figure 6 and in the direction of the arrows, showing the internal structure of the valve to control the suction in the mandrel shaft and mandrel ports.

Referring again to Figure 5 the axial passage 150 in the mandrel 16 is seen. This passage has the laterally opening ports 26 communicating therewith and this passage also has the hose connection nipple 152 opening thereinto through the radial slots 154 in the spindle portion 120 of the mandrel 16. This nipple 152 has the flexible hose 156 connected thereto, the hose also being connected to an elbow 158 which opens into the valve chamber 160 of the valve 32. A line 162 which is adapted for connection with a conventional suction pump also opens into the valve chamber 160 for control by the valve core 164. This valve core is passed through an opening 166 in the support 100 and extends to and through the opening 98. Accordingly a portion of the valve core 164 which is remote from the actual valve body may be considered the valve stem inasmuch as it is contacted by the carriage block 104 in order to operate it. Specifically, there is a first stop 170 and a second stop 172 adjustably secured to the valve stem. They are adjustably connected with the valve stem by any suitable and conventional means, such as set screws and they are located in the line of travel of the carriage block 104. Therefore, when the carriage block 104 moves to the position of one-half completion of its cycle of operation the stop or block 170 is contacted by the carriage block 104 thereby pulling the valve stem 164 so as to open the valve 32 allowing the ports 26 to be suction ports. Through the medium of the conventional suction pump connected with the line 162 a condition of vacuum exists in the ports 26 so as to do the holding of the edge of the label 14 opposite from the edge having the glue thereon, as described in connection with the general operation of the device. This valve setting is retained until such time that the carriage block returns sufficiently far to contact the stop 170 and push the valve stem to the position disclosed in Figure 9 that is, the valve closing position.

Attention is now invited to the functional utility of the carriage block 106 which is mounted for linear movement on the set 94 of rails. After the block 104 has completed its cycle of operation the block 106 is actuated. A rack 190 is secured to the block 106 and is meshed with the teeth of the quadrant 192. Therefore, when the block 106 moves in its reciprocatory travel the shaft 194 to which the quadrant 192 is attached is rotated. The gear or quadrant 196 which is also fixed to the shaft 194 is also rotated. The quadrant 196 being enmeshed with the rack bar 198 causes the rack bar to move axially. This rack bar is rigidly fixed to or formed integral with a push rod 200 which passes through openings serving as bearings in the supports 126 and 128 to thereby operate the ejector or pusher 30 for the label 14 which has been shaped in cylindrical form. It has been found that the simple collar or sleeve 202 which is disposed on the mandrel 16 serves the purpose of ejecting the cylindrical or tubular label effectively.

A lubricant retaining element, for example felt, is disposed in a recess 204 formed in the mandrel 16 near its inner end. This felt element 206 is of an outer diameter substantially equal to the outer diameter of the mandrel 16. Therefore, when the push rod 200 is pulled inwardly by the quadrant 196 the inner surface of the sleeve 202 becomes lubricated by contact with the felt element 206.

A suitable support or standard 210 is disposed on the bottom or base 54 of the housing 40 and through the medium of conventional anti-friction bearings 212 the spindle or shaft 194 is mounted vertically.

Figure 7:
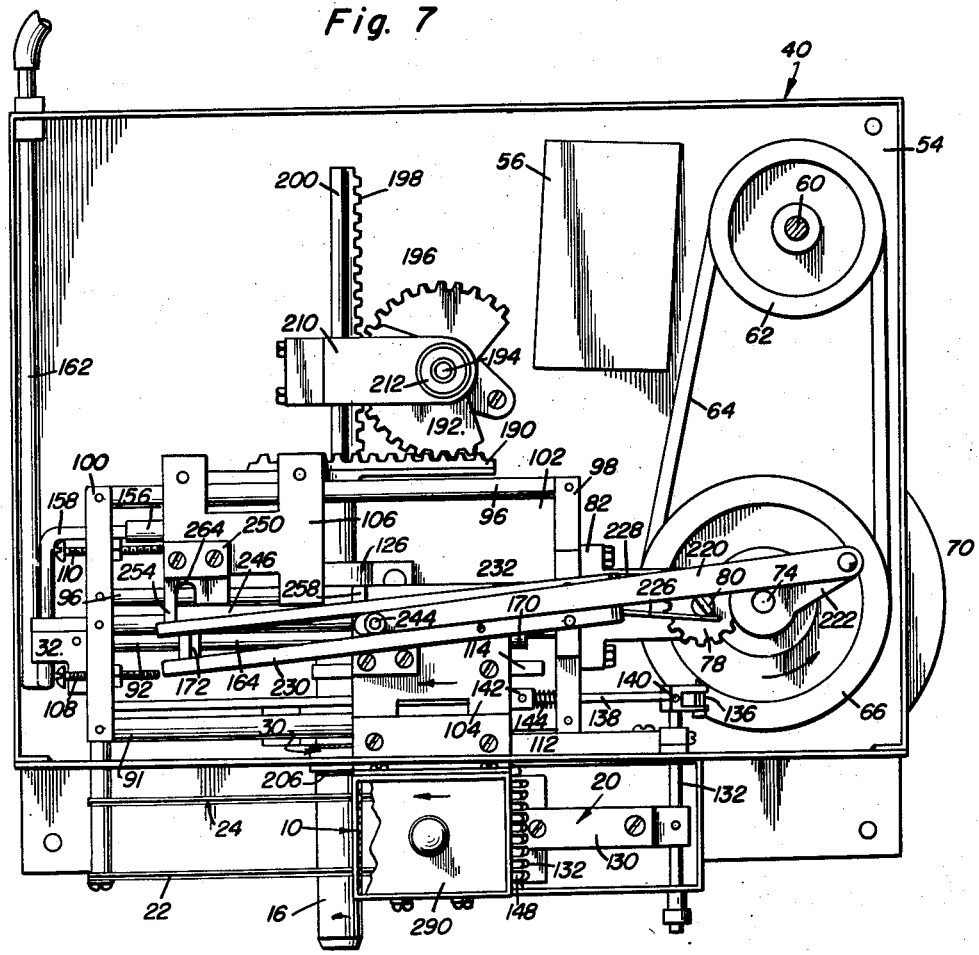
Figure 7 is a top view somewhat similar to that of Figure 6 but showing the disposition of the various elements when the first carriage block has moved slightly more than one-half of its cycle (reciprocatory) of operation.
Figure 16:
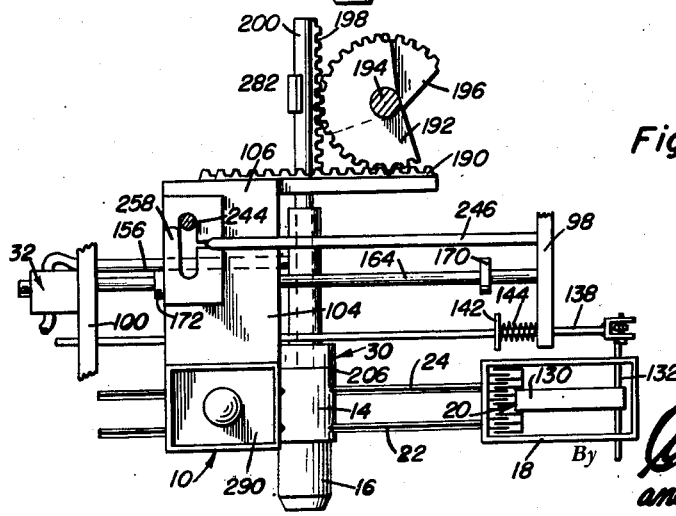
Figure 16 is a schematic view showing in plan the relationship of the magazine when the second carriage block is about to be moved, which will operate the rod to urge the discharge element on the mandrel outwardly thereof.

As the carriage block 106 is moved from an initial starting position disclosed in Figure 7 the push rod 200 is operated outwardly to operate the ejector 30. Then, as the carriage block 106 is returned, the push rod 200 is operated in the opposite direction to retract the ejector 30.

Reference is now made to the specific means for causing the movement of the carriage blocks 104 and 106. As described the carriage block 104 had to complete a single reciprocatory cycle of operation entirely independent of any movement of the carriage block 106. The same holds true for the carriage block 106 inasmuch as it must perform a single reciprocatory cycle of operation in the absence of any movement of the carriage block 104.

To accomplish this there is a rod 220 which is pivoted to a crank 222. The crank is fixed to the shaft 74 whereby it derives its operation from the motor 52. The pinion 76 which is enmeshed with the gear 78 is arranged to provide a two to one gear ratio so that for every revolution of the shaft 74 there is only one-half a complete revolution of the gear 78.

A vertically rising pin 224 is fixed to the gear 78 and is arranged to contact successively the springs 226 and 228, respectively. The spring 226 is fixed to one end of the guide or guide bar 230, while the spring 228, preferably of the leaf type, is fixed to the corresponding end of the guide or guide bar 232. These guide bars are mounted by means of pivot pins 234 and 236 upon the support 98. A small and light spring 240 is connected to both guides to prevent excessive separation thereof. Inasmuch as the guides are spaced slightly from each other they define a guideway in the space between them.

The outer end of the rod 220 has a pin or operating element 244 carried thereby which is disposed in the guideway between the guides 230 and 232.

A divider bar 246 is located between and below the guides 230 and 232 and is employed for the purpose of holding releasably the element 244 in the pockets provided in each block 104 and 106.

The means forming the pockets are disclosed best in Figure 4. There is a plate 250 secured to the upper surface of the carriage block 106 and it is provided with a recess 252 in its upper surface. An arm 254 extends outwardly from the edge of the block or plate 250 and is disposed under the arm 258 which projects from a block or plate 260 on the block 104. There is a notch 264 formed in the plate 250 which opens laterally of the plate. This notch constitutes a pocket to seat releasably the element 244. There is another notch 266 (Figure 8) but this one is provided in the block 260 and constitutes another seat for the element 244, releasably retaining it so as to cause linear movement of the block 104.

The plates 260 and 250 have been described as individual or separate from the carriage blocks on which they are disposed. It is within the purview of the invention to form the carriage blocks 106 and 104 with the notches directly therein or with the plates 250 and 260 integrally connected therewith.

Figure 6:
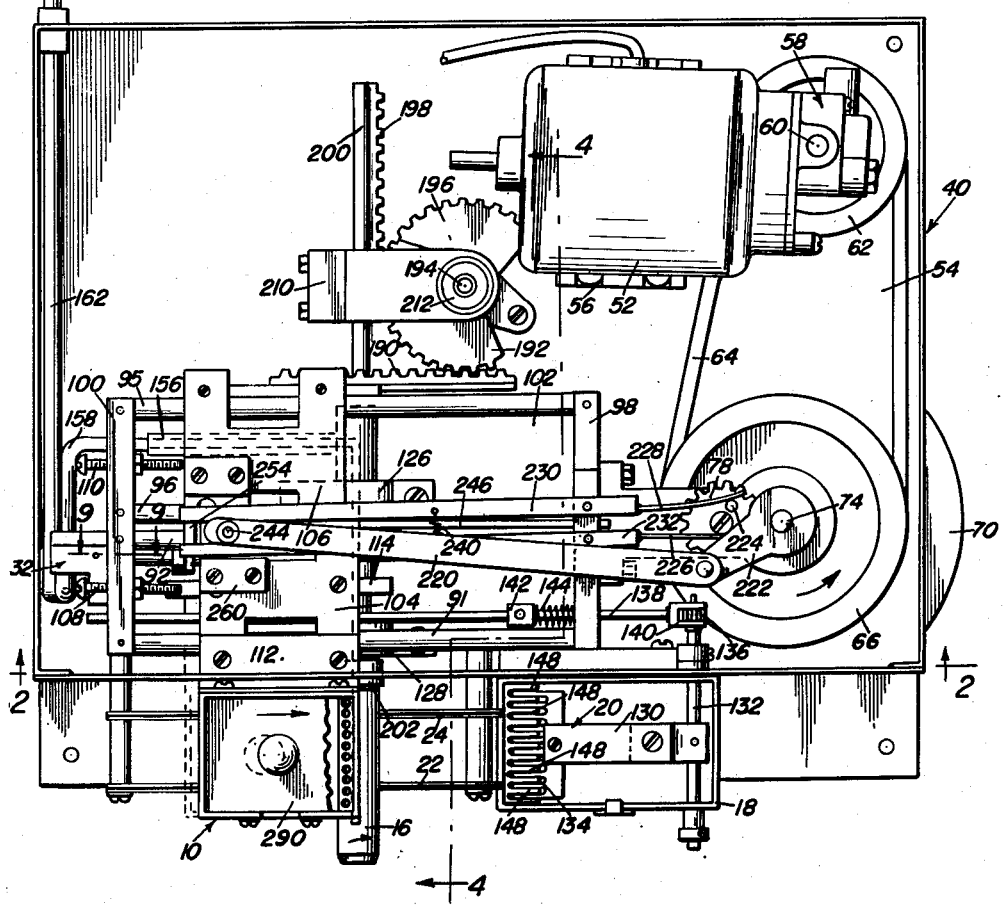
Figure 6 is a top view of the device with the cover of the housing removed.

The operation of the means for reciprocating the individual carriage blocks 104 and 106 is as follows: when the crank 222 is actuated the push rod 220 is caused to oscillate. Starting from the position shown in Figure 6 the push rod 220 is moved rearwardly, the element 244 being disposed in the pocket in the block 104. The element 244 is now bearing against one lateral surface of the guide bar 246, and the element is disposed in the guideway formed between the guides 230 and 232. Meanwhile the gear 78 is rotating. During this time the spring 228 being flexed by the pin 224 which contacts it shifts the guide 230 against the side of the element 244.

After the crank is rotated to the position disclosed in Figure 7 the pin 224 is freed from the spring 228 preparatory to contacting the spring 226. When that contact is made the guide 230 is shifted in a direction so that its outer end is urged toward the carriage block 106. The element 244 actually leaves the pocket 266 and comes to rest in the pocket 264 when the element 244 passes around the tapered outer end of the guide bar 246. Then, when the carriage block 106 begins its linear movement the guide 230 presses the element 244 firmly in the pocket 264.

There is a continual shifting of the element 244 from one pocket to the other after one of the carriage blocks has completed a full reciprocatory movement.

In the event that one of the blocks, for example the block 106 becomes displaced on the set of rails to which it is connected, the element 244 striking the arm 254 will return the second carriage block 106 to the initial rest position (Figure 7) so that there will be no cessation during the operation of the machine arising from this cause.

An aperture or recess 280 is provided in the outer end of the spindle 16 and constitutes a holder for the container 34. As described the worker by simply holding the neck end of a flexible tube or other container in the recess 280 may have the tubular or cylindrical label inserted directly thereon after ejectment from the mandrel 16.

In the structural makeup of the machine there are certain mechanical expedients resorted to, for example the use of the guide 282 to assist in holding the ejector or push rod 200 in proper alignment for smooth operation. Other mechanical variations and expedients such as the use of spring fingers 286 and 288 to hold the stack 12 of labels in the magazine beneath the weight 290 will become apparent.

The operation of the specific assemblies has been described previously and the general operation of the entire machine has also been set forth. Accordingly further discussion of the structure illustrated is deemed unnecessary.

Having described the invention, what is claimed as new is:

1. A device for forming tubes from sheet stock for application on articles, said device comprising a base, a first carriage block and a second carriage block, means mounting said blocks on said base for linear movement, a mandrel having suction ports and having its axis extending transversely the path of movement of the first block carried by said base, means operatively connecting said first block to said mandrel to rotate said mandrel when said first block is moved, a sheet stock magazine connected with said first block and arranged in juxtaposition with said mandrel so that the bottom sheet contacts said mandrel when said magazine passes said mandrel, a valve to control the suction of said suction ports, said valve being arranged to be opened when said first block reaches a predetermined point in its linear movement, means carried by said base for applying glue to one edge of the bottom sheet in said magazine whereby when said first block moves rearwardly and as the bottom sheet is held on said mandrel through the action of the low pressure of said suction ports the glued edges of the sheet will overlap and adhere to the other edge of the sheet, said valve being also arranged to be closed after the sheet has been wrapped around said mandrel by the rotary movement of said mandrel, and means connected with said second carriage block and said mandrel for discharging the sheet stock tube from said mandrel.

2. A device for forming tubes from sheet stock for application on articles, said device comprising a base, a first carriage block and a second carriage block, means mounting said blocks on said base for linear movement, a mandrel having suction ports and having its axis extending transversely the path of movement of the first block carried by said base, means operatively connecting said first block to said mandrel to rotate said mandrel when said first block is moved, a sheet stock magazine connected with said first block and arranged in juxtaposition with said mandrel so that the bottom sheet contacts said mandrel when said magazine passes said mandrel, a valve to control the suction of said suction ports, said valve being arranged to be opened when said first block reaches a predetermined point in its linear movement, means carried by said base for applying glue to one edge of the bottom sheet in said magazine whereby when said first block moves rearwardly and as the bottom sheet is held on said mandrel through the action of the low pressure of said suction ports the glued edge of the bottom sheet will overlap and adhere to the other edge of the bottom sheet, said valve being also arranged to be closed after the sheet has been wrapped around said mandrel by the rotary movement of said mandrel, and means connected with said second carriage block and said mandrel for discharging the sheet stock tube from said mandrel, means for moving said first carriage block through a single reciprocatory cycle and for moving said second carriage block through a single reciprocatory cycle while said first carriage block is at rest.

3. The combination of claim 2 and the means for moving said carriage blocks including a push rod, a crank connected with said push rod, an assembly to operate said crank and including a rotary member having a pin connected thereto, a first and a second pivoted guide, springs attached to said arms, said springs being arranged to be contacted successively by said pin when said rotary member is actuated to thereby yieldingly pivot said guides, a carriage block operating element secured to said push rod, means forming pockets in said blocks to accommodate said element so that when said push rod is actuated by said crank, said guides through the action of said springs and said pin shift said element into the pocket in the first block to move said first block and then shift said element in the pocket in said second block to move said second block.

4. The combination of claim 3 and means for releasably holding said element in said pockets.

5. The combination of claim 2 and said glue applying means including a bank of fingers arranged to dip into a glue supply and contact an edge of the bottom sheet in said magazine, and means located between said fingers for breaking the webs of glue on said fingers as said fingers are lifted to contact said sheet.

6. A device for forming tubes from sheet stock for application on flexible containers, said device comprising a base, a first carriage block and a second carriage block, means mounting said blocks on said base for linear movement, a mandrel having suction ports and having its axis extending transversely the path of movement of the first block carried by said base, means operatively connecting said first block to said mandrel to rotate said mandrel when said first block is moved, a sheet stock magazine connected with said first block and arranged in juxtaposition with said mandrel so that the bottom sheet contacts said mandrel when said magazine passes said mandrel, a valve to control the suction of said suction ports, said valve being arranged to be opened when said first block reaches a predetermined point in its linear movement, means carried by said base for applying glue to one edge of the bottom sheet in said magazine whereby when said first block moves rearwardly and as the bottom sheet is held on said mandrel through the action of the low pressure of said suction ports the glued edge of the sheet will overlap and adhere to the other edge of the sheet, said valve being also arranged to be closed after the sheet has been wrapped around said mandrel by the rotary movement of said mandrel, and means connected with said second carriage block and said mandrel for discharging the sheet stock tube from said mandrel, means for moving said first carriage block through a single reciprocatory cycle and for moving said second carriage block through a single reciprocatory cycle while said first carriage block is at rest, and said mandrel having a container holder at the outer end thereof so that the tubes removed from said mandrel by said discharging means are applied directly to the containers.

7. In a machine for forming tubes from sheets, an open bottom magazine to hold a stack of sheets, at least one rail disposed below the open bottom of said magazine to support the sheets, means for reciprocating said magazine, a rotary mandrel arranged in juxtaposition with said magazine and having its axis transverse to the path of travel of the magazine, a glue applicator, means for moving said applicator against one edge of the bottom sheet in said magazine, said mandrel having a suction port which is arranged to hold the other edge of the bottom sheet when said magazine is moving away from said glue applicator, and said mandrel being of a smaller periphery than the length of the sheet so that the said edges of the sheet overlap.

8. In a machine for forming tubes from sheets, an open bottom magazine to hold a stack of sheets, at least one rail disposed below the open bottom of said magazine to support the sheets, means for reciprocating said magazine, a rotary mandrel arranged in juxtaposition with said magazine and having its axis transverse to the path of travel of the magazine, a glue applicator, means for moving said applicator against one edge of the bottom sheet in said magazine when said magazine is substantially at one end of its movement in its reciprocatory travel, said mandrel having a suction port with a suction line connected therewith so that when said magazine moves away from said applicator the bottom sheet is attached to said mandrel by suction, the relation of length of sheet to periphery of mandrel being such as to cause overlap of opposite edges of sheet to form a tube on the mandrel when said magazine moves over said mandrel.

9. In a machine for forming tubes from sheets, an open bottom magazine to hold a stack of sheets, at least one rail disposed below the open bottom of said magazine to support the sheets, means for reciprocating said magazine, a rotary mandrel arranged in juxtaposition with said magazine and having its axis transverse the path of travel of the magazine, a glue applicator, means for moving said applicator against one edge of the bottom sheet in said magazine when said magazine is substantially at one end of its movement in its reciprocatory travel, said mandrel having a suction port with a suction line connected therewith so that when said magazine moves away from said applicator the bottom sheet is attached to said mandrel by suction, the relation of length of sheet to periphery of mandrel being such as to cause overlap of opposite edges of sheet to form a tube on the mandrel when said magazine moves over said mandrel, a valve to control said suction line, means for closing said valve when said carriage has moved sufficiently as to have discharged the bottom label from the magazine, and means for removing the tube from said mandrel after said valve has been closed.

10. In a device for forming a tube from a sheet by overlapping opposite edges of the sheet after applying glue to one of said edges, said device including a rotary mandrel with means to rotate it, a magazine to hold a stock of sheets, said magazine being arranged in juxtaposition with said mandrel with the axis of the mandrel transverse the path of travel of the magazine so that the bottom sheet contacts said mandrel during a part of the travel of said magazine, and means for moving said magazine linearly at such speed that the bottom sheet moves with said mandrel at the same speed as the outer surface of the mandrel so that there is substantially no movement of the sheet with respect to said mandrel.

11. In a device for forming a tube from a sheet by overlapping opposite edges of the sheet after applying glue to one of said edges, said device including a rotary mandrel with means to rotate it, a magazine to hold a stock of sheets, said magazine being arranged in juxtaposition with said mandrel, said mandrel having its axis transverse the path of travel of the magazine so that the bottom sheet contacts said mandrel during a part of the travel of said magazine, means for linearly moving said magazine over said rotary mandrel so that the bottom sheet contacts said mandrel, means for releasably holding at least one edge of the sheet on the mandrel while it is being rotated, the mandrel being of such size that the opposite edges of the sheet overlap, and discharging means for the overlapped sheet mounted slidably on said mandrel.

12. In a device for forming tubes from sheets of flexible material, a base, a first set of rails and a second set of rails disposed in side-by-side relationship, means mounting said rails on said base, a first carriage block disposed on said first set of rails, a second carriage block disposed on said second set of rails, means forming pockets in said carriage blocks, means for reciprocating said first block on said first rails and for also reciprocating said second block on said second set of rails after reciprocation of said first block, a magazine for a stack of sheets, means attaching said magazine to said first block for movement therewith, said magazine having an open bottom, fixed supports for the labels disposed below the open bottom of said magazine, a rotary mandrel arranged in juxtaposition with said magazine and having a suction port therein, said mandrel having its axis disposed transverse the path of travel of the first block, a glue applicator carried by said base, means for lifting said glue applicator when said first block has moved substantially to one end of said first set of rails, whence said magazine is located above said applicator so that glue is applied to one edge of the bottom sheet in said magazine, the mandrel and sheet length being of such sizes that when said block is returned and the bottom sheet is held by suction on the mandrel, there is an overlap at opposite edges of said sheet to thereby provide a gluing region, means for breaking the suction of said port when said first carriage block has returned to the opposite end of said first set of rails, means for discharging the tube from the mandrel and disposed on said mandrel, said last mentioned means includign a rod, a transmission connected to said rod, and means secured to said second block for actuating said transmission in response to movement of said second block on said second set of rails.

13. The combination of claim 12 and said mandrel having an outer end with an opening therein to accommodate a flexible container having a longitudinal axis in alignment with the longitudinal axis of said mandrel so that when the tube is discharged from said mandrel it is applied to the container held in said opening.

14. In a device for forming tubes from sheets of flexible material, a base, a magazine, means mounting said magazine on said base for reciprocation, and means for reciprocating said magazine and having its axis transverse the path of movement of the magazine, a rotary mandrel disposed in juxtaposition with said magazine, and means operatively connected with said mandrel for holding one edge of the bottom sheet in said magazine while said mandrel rotates thereby pulling the bottom sheet from said magazine so that the bottom sheet is formed in the shape of said mandrel.

15. In a device for forming tubes from sheets of flexible material, a base, a magazine, means mounting said magazine on said base for reciprocation, and means for reciprocating said magazine and having its axis transverse the path of movement of the magazine, a rotary mandrel disposer in juxtaposition with said magazine, and means operatively connected with said mandrel for holding one edge of the bottom sheet in said magazine while said mandrel rotates thereby pulling the bottom sheet from said magazine so that the bottom sheet is formed in the shape of siad mandrel, said mandrel being of such size with respect to the size of sheets that opposite edges of the sheets on the mandrel overlap, and means mounted on said base for applying glue on one edge of the sheet before it is overlapped on the mandrel.

16. A device for forming a tube from a sheet of flexible material, a first pair of rails and a second pair of rails disposed in side by side relationship, a first carriage block mounted on said first set of rails, means for moving said first block on said first set of rails in a linear and reciprocatory travel, a second carriage block disposed on said second set of rails for similar movement by the said moving means after said first block has completed a single cycle of movement, a magazine connected to said first block for movement therewith, a mandrel mounted in juxtaposition with said magazine and having its axis disposed transverse of the first block for rotary movement, means connected to said first block and to said mandrel for operating said mandrel when said first block is moved in one direction and for operating said mandrel in the opposite direction when said first block is moved in the opposite direction, said mandrel having a passage therein, a suction port opening laterally through said mandrel to hold one edge of the bottom sheet in said magazine when said magazine has once passed over said mandrel and is returning over said mandrel, means to apply glue to the bottom sheet in said magazine prior to the suction holding of the bottom sheet, whereby when said magazine has returned completely over said mandrel the bottom sheet is contained on the mandrel in the shape of the mandrel, and means for urging the formed sheet from the mandrel when said second block is operated in its reciprocatory travel on said second set of rails.

FRANCIS C. WORTH.

REFERENCES CITED

The following references are of record in the file of this patent:

UNITED STATES PATENTS

| Number | Name | Date |
| --- | --- | --- |
| 1,133,858 | Grimm et al. | Mar. 30, 1915 |
| 2,083,539 | Affelder | June 15, 1937 |
| 2,292,402 | Paynter | Aug. 11, 1942 |
| 2,350,334 | Baker | June 6, 1944 |
| 2,461,056 | Hess | Feb. 8, 1949 |
| 2,517,395 | Lewis | Aug. 1, 1950 |
| 2,548,451 | Tribbey | Apr. 10, 1951 |